May 12, 1970        E. L. WEBB        3,511,328
POWER VEHICLE SAFETY DEVICE
Filed Aug. 18, 1969
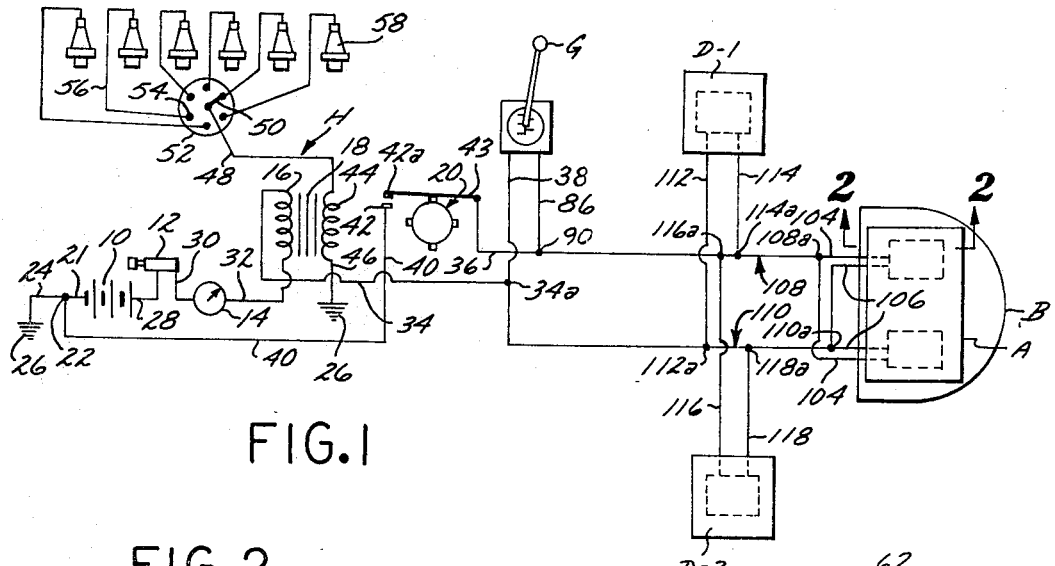
FIG.1
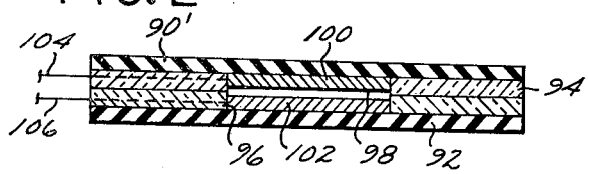
FIG.2
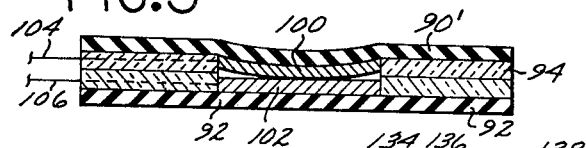
FIG.3
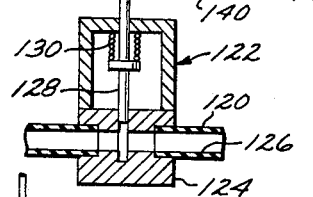
FIG.7
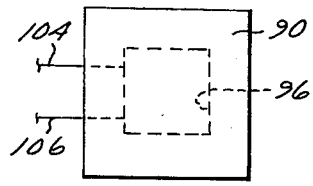
FIG.5
FIG.4
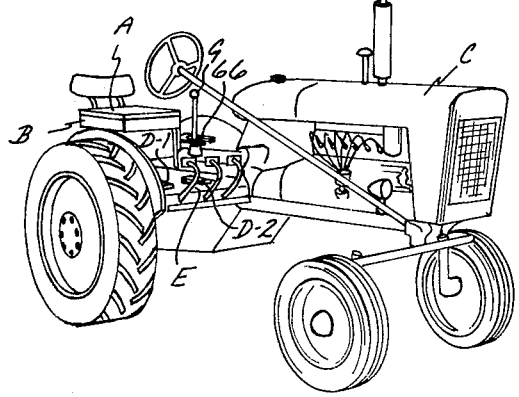
FIG.6
INVENTOR.
ELDON L. WEBB
BY
William G. Babcock
ATTORNEY United States Patent Office 3,511,328
Patented May 12, 1970

3,511,328
POWER VEHICLE SAFETY DEVICE
Eldon L. Webb, 1934 E. Wilson,
Orange, Calif. 92667
Substituted for abandoned application Ser. No. 646,081, June 14, 1967. This application Aug. 18, 1969, Ser. No. 851,032
Int. Cl. B60k 27/08
U.S. Cl. 180—101
2 Claims

ABSTRACT OF THE DISCLOSURE

A portable device that permits a power vehicle to continue in operation and move only so long as pressure is exerted on the device such as when a user sits or stands thereon. Plural pressure switches responsive to the user can complete the ignition circuit or open a valve in the fuel line.

CROSS-REFERENCES TO RELATED APPLICATIONS

This application is a substitute for Ser. No. 646,081, filed June 14, 1967, now abandoned.

BACKGROUND OF THE INVENTION

Field of the invention

The invention relates generally to the field of safety devices, and more particularly to a portable pad or cushion that is so electrically connected to the ignition system of an internal combustion engine powered vehicle that the vehicle will only operate so long as the driver thereof is standing or sitting on the pad or cushion.

Description of the prior art

Prior to the present invention safety devices have been provided on trucks, tractors and the like, but such devices had the disadvantages that they were of a complicated structure, expensive, and had to be included as a part of the vehicle at the time it was manufactured.

SUMMARY OF THE INVENTION

A resilient pad containing normally open electrical switching means that is operatively associated with the ignition system of an internal combustion engine powered vehicle in such a manner that the vehicle can only be operated and move so long as the driver thereof is standing or sitting on the pad to close said switching means contained therein.

A major object of the present invention is to provide a safety device that can be removably mounted on the seat of a power vehicle such as a tractor, lift truck, motorboat or the like, which device permits the engine of the vehicle to operate only so long as the operator remains sitting on the seat thereof, or if not sitting on the seat, the vehicle engine will only operate if the gear shift lever thereof is in the neutral position.

Another object of the invention is to provide a safety device of the character described having the further operational advantage that it may include means removably mounted on the floorboard of the vehicle and will permit the vehicle engine to operate so long as the operator exerts downward pressure thereon, even though the operator may not be sitting in the seat of the vehicle, or should the gear shift of the vehicle be in other than the neutral position.

Yet another object of the invention is to provide a safety device for use on power vehicles that has an extremely simple mechanical structure, is easy to mount on or be removed from the vehicle, is easy and convenient to use, inexpensive to manufacture, requires little or no maintenance, and can be sold at a sufficiently low price as to encourage its widespread use on power vehicles for safety purposes.

A further object of the invention is to provide a safety device that is equally well adapted for use on power vehicles which are motivated by internal combustion engines as well as diesel engines.

BRIEF DESCRIPTION OF THE DRAWING

FIG. 1 is a diagrammatic plan view of the invention when utilized on a vehicle powered by an internal combustion engine, such as a tractor or the like;

FIG. 2 is a fragmentary transverse cross-sectional view of the actuating portion of the safety device taken on line 2—2 of FIG. 1, showing the actuating portion in a position wherein the internal combustion engine is inoperative;

FIG. 3 is also a transverse cross-sectional view of the actuating portion of the device taken on the same line of FIG. 2, showing the actuating portion being subjected to a downwardly directed force that deforms the same and permits operation of the engine of the vehicle;

FIG. 4 is a plan view of one of the actuating portions of the invention that is adapted to be mounted on the floorboard of the vehicle;

FIG. 5 is a fragmentary perspective view of that portion of the safety device which movably engages the gear shift of the vehicle on which it is mounted, and only permits the engine to operate when the gear shift is in neutral unless the operator is sitting on the seat or standing on one of the portions of the invention disposed on the floorboard;

FIG. 6 is a top perspective view of a tractor on which the safety device is removably mounted; and FIG. 7 is a cross-sectional view of a modification of the invention that permits it to be used on a vehicle powered by a diesel engine.

DESCRIPTION OF PREFERRED EMBODIMENTS

Referring now to FIGS. 1 and 7 of the drawing for the general arrangement of the invention, it will be seen to include a resilient pad A that is removably mounted on a seat B of a power-operated vehicle C. The safety device of the present invention also includes two pads D-1 and D-2 which are removably mounted on the floorboard E of vehicle C. An electrical switch F is shown in FIG. 5 that is in the the closed position only when a gear shift lever G is in the neutral position.

If the operator (not shown) of the vehicle C is sitting on pad A, or standing on one of the pads D-1 or D-2, the ignition system H of the vehicle (FIG. 1) can be electrically energized to cause operation of the vehicle motor (not shown). However, when the operator is not sitting on pad A, or standing on pads D-1 or D-2, the vehicle motor can only be operated if the gear shift lever G is in the neutral position.

The ignition system H of vehicle C is composed of two circuits, the primary and the secondary. The primary circuit is the low voltage circuit, and the secondary is the high voltage circuit. The component parts of the primary circuit comprise a battery 10, ignition switch 12, ammeter 14, the primary winding 16 of an ignition coil 18, and a cam and breaker points assembly referred to generally by the numeral 20. The battery 10 merely furnishes electrical energy to the system in the conventional manner until the engine fires and the generator (not shown) takes over. One terminal of battery 10 is connected by an electrical conductor 21 to a junction point 22 from which a conductor 24 extends to a ground 26.

The other terminal of battery 10 is connected by a conductor 28 to one terminal of the ignition switch 12, with the other terminal of the ignition switch being connected by an electrical conductor 30 to the ammeter 14.

Ammeter 14 is connected by an electrical conductor 32 to the primary winding 16. The primary winding 16 in turn is connected by a conductor 34 to a junction point 34a. Junction point 22 is connected by an electrical conductor 40 to a contact 42 that is intermittently engaged by a second contact 42a on a movable arm 43 as the engine operates, which contacts and arm form a part of the cam and breaker point assembly 20. The arm 43 is connected by an electrical conductor 36 to a junction point 90. The junction point 34a forms a part of an electrical conductor 110, as may be seen in FIG. 1, that is connected to a junction point 112a.

The high voltage portion of the circuit includes a secondary winding 44 that forms a portion of the ignition coil 18 and is connected by a conductor 46 to ground 26. The secondary winding 44 is also connected by a conductor 48 to an arm 50 that is rotated by the motor (not shown) of the vehicle. Arm 50 is part of a conventional distributor 52 that includes a number of points 54 which are contacted sequentially by the arm, and cause high voltage electrical current to flow through conductors 56 in sequence to a number of spark plugs 58 forming a part of the motor. It will be obvious from the above description that unless electrical energy is supplied from the cam and breaker point assembly 20, the engine cannot be started, or if the current to the cam and breaker points is interrupted, the engine will stop.

The electrical circuit between the junction points 34a, 90 can be completed through closing of either the electrical switch F shown in FIG. 5, or completion of the electrical circuit through one of the pads D-1 or D-2, or through the pad A. The switch F is shown disproportionately large relative to the gear shift lever G for the sole purpose of more clearly illustrating one structure that can be utilized with the present invention.

The gear shift lever G projects upwardly in the conventional manner from a housing 60 in which it is movably supported to be shiftable to any one of the positions 61, 62, 63 or 64 shown in phantom line. As lever G is shifted to any one of the positions 61, 62, 63 or 64, that portion of the lever above housing 60 moves both laterally and longitudinally. To permit such lateral and longitudinal movement of the gear shift lever G, the switch F includes a bifurcated horizontally disposed member 66 in which a slot 68 is formed that is slidably engaged by lever G. A lug 70 projects downwardly from member 66 and is in parallel abutting relationship with a flange 72 that projects upwardly from a base 74. Base 74 can be affixed to floorboard E by a screw or bolt 76. Lug 70 is pivotally supported on flange 72 by a bolt 78 which extends therethrough. An electrical contact 80 is supported on and electrically insulated from base 74. A rigid metallic blade or wiper 82 extends downwardly from lug 70, and engages contact 80 only when the gear shift lever G is vertically disposed in the neutral position. Contact 80 is connected to junction 34a by an electrical conductor 38. Similarly, blade 82 is connected to an electrical conductor 86 that extends to junction 90. The junction of conductors 36 and 38 is generally designated by the numeral 90 in FIG. 1.

Pads A, and D-1 and D-2 are of identical structure other than the pad A has two pairs of electrical switching members therein, while each of the pads D-1 and D-2 have single pairs of switching members. Each pad A, D-1 and D-2 comprises an upper resilient sheet 90', lower resilient sheet 92, such as rubber or the like, and spacer sheets 94 disposed therebetween in which an opening 96 is formed. The side edge surfaces of opening 96 and the adjacent surfaces of sheets 90 and 92 cooperatively define an interior cavity 98. Two electrical conducting members 100 and 102 formed of a resilient metal sheet, a metal screen, or the like, are disposed in cavity 98, and are normally vertically separated from one another by being bonded to the adjacent surfaces of sheets 90' and 92, as may best be seen in FIG. 2. Of course, other means may be employed to maintain members 100 and 102 separate from one another when the pads A, D-1 and D-2 are not subjected to any downwardly directed forces.

The two pairs of members 100 and 102 are each connected by electrical conductors 104 and 106 to two conductors 108 and 110 at junctions 108a and 110a thereof. Conductors 108 and 110 are connected to junctions 90 and 34a respectively, as best seen in FIG. 1. The separated electrical conducting members 100 and 102 in pad D-1 are connected to electrical conductors 112 and 114 respectively. Conductors 112 and 114 extend to junction points 112a and 114a respectively on conductors 108 and 110. Likewise, the separated electrical conducting members 100 and 102 of pad D-2 are connected by conductors 116 and 118 that extend to junction 116a and 118a on conductors 108 and 110 respectively.

Operation of the invention when installed on a vehicle C as previously described is extremely simple. Closing of the ignition switch 12 will only permit the motor of the vehicle to be started if the gear shift lever G is in the neutral position, or if the operator is sitting on pad A or pressing downwardly with his foot on one or both of the pads D-1 or D-2. Assuming that the vehicle C is operating, the vehicle will continue so to do if the operator stands with one of his feet on one of the pads D-1 or D-2. The vehicle will not stop under such circumstances for the electrical circuit to the ignition system (FIG. 1) is completed through members 100 and 102 in one of the pads D-1 or D-2, and the electrical conductors 112 and 114 or 116 and 118 connected to conductors 108 and 110 that extend to junction points 90 and 34a.

If the operator is sitting on seat B, and even leaning over to one side, one of the pairs of electrical conducting members therein will be moved by his weight into pressure contact, as shown in FIG. 3, to complete the electrical circuit and energize the ignition system. However, should the operator fall or otherwise become unseated from seat B, the resiliency of sheets 90' and 92 will cause the electrical conductors 100 and 102 to separate and move to the position shown in FIG. 2, to break the electrical circuit to ignition system H whereby operation of the motor stops immediately, which in turn stops the vehicle, and injury to the operator by the equipment being drawn thereby is avoided. The switch F (FIG. 5) permits the vehicle motor C to continue operating when the gear shift lever G is in the neutral position, even though the operator may not be sitting on the seat B or pressing downwardly on the pads D-1 or D-2.

Should it be desired to use the safety device of the present invention on a vehicle that is powered by a diesel engine (not shown), the device may be modified by use of the apparatus illustrated in FIG. 7. That portion of the device to the right of junction 34a (FIG. 1) is used on a vehicle powered with a diesel engine. The diesel engine which actuates the vehicle C is supplied with fuel through a line 120 that extends from the fuel reservoir (not shown) to the engine. A valve 122 that includes a valve body 124 is inserted in line 120. A fuel passage 126 extends through valve body 124, and this passage is obstructable by downward movement of a plunger 128 that is at all times urged downwardly of this obstructing position by a compressed helical spring 130 to prevent fuel flow from the reservoir to the engine.

A solenoid 132 is provided, which when electrically energized, draws plunger 128 upwardly to the position shown in FIG. 7 against the compression of spring 130 to permit flow of fuel through line 120 and passage 126 to the engine. One side of the winding on the solenoid 132 is connected by an electrical conductor 134 to one terminal of a battery 136, with the other battery terminal being connected by a conductor 138 to junction 90. The winding on the solenoid is also connected by a conductor 140 to junction 34a. When the operator of a diesel powered vehicle C is sitting on the seat B or standing on one of the pads D-1 or D-2, or the gear shift G is in the neutral position, the electrical circuit which energizes solenoid 132 is completed, and the valve member 128 is disposed in the upper position where fuel can flow from the reservoir to the engine through line 120 and passage 126. However, when the operator is displaced from seat B or is inadvertently unseated therefrom, or is not standing on one pad D-1 or D-2, and the gear shift lever G is in any position other than neutral, the electrical circuit to the solenoid 132 is broken and the compressed spring 130 immediately moves plunger 128 into the valve closing position to prevent further discharge of fuel from the reservoir to the engine, whereby the vehicle C is stopped.

The modified form of the invention will be seen to operate substantially in the same manner as that of the form of the invention first described, other than it is applicable to a diesel powered vehicle C.

I claim:

1. A portable safety device in the form of a pad capable of being removably mounted on a seat situated above the floorboard of a power vehicle for the new use of stopping said vehicle when an operator sitting on said pad moves out of pressure contact therewith, with the structure of said vehicle including an internal combustion engine and a battery-energized electrical ignition circuit that is open which embodies two separate junction points, said circuit being adapted to be closed to permit operation of said engine only if a normally open ignition lock forming a part of said system in in a closed position and said junction points are electrically connected, said safety device comprising:
    (a) A first pad at least partially fabricated from a resilient material, and said pad having a cavity formed therein, which pad is adapted to be removably disposed on said seat;
    (b) two first vertically spaced electrical conducting members bonded to said material and disposed in said cavity, said members being in contact only when a downward force is exerted on said pad by said operator sitting thereon, but which members are moved out of said contact when said operator moves out of contact with said pad;
    (c) two first electrical conductors extending from said members to said junction points that complete said circuit only when said operator is sitting on said pad;
    (d) a second pad and two vertically spaced electrical conducting members of the same structure as said first pad and said first two members, which said second pad is disposed on said floorboard; and
    (e) two second electrical conductors that extend from said two second electrical conducting members to said two junction points, with said vehicle being capable of operation either when said operator is sitting on said first pad or exerting downward pressure on said second pad by standing thereon.

2. A portable safety device as defined in claim 1 wherein said vehicle includes a gearshift lever and an electrical switch, two third electrical conductors extending from said switch to said two junction points, and means for moving said switch from an open to a closed position by movement of said gearshift lever, which switch is in a closed position only when said gearshift lever is in a neutral position.

References Cited

UNITED STATES PATENTS

| | | | |
|---|---|---|---|
| 1,529,889 | 3/1925 | Hoffman et al. | 180—102 |
| 1,956,978 | 5/1934 | Nafziger | 180—101 |
| 2,250,754 | 7/1941 | Dooley | 180—101 |
| 2,550,999 | 5/1951 | Hoffman et al. | 180—101 |
| 2,708,005 | 5/1955 | Gazzo | 180—101 |
| 3,305,724 | 2/1967 | Shaheen | 180—102 X |
| 3,323,197 | 6/1967 | Millard | 200—86 X |

KENNETH H. BETTS, Primary Examiner

U.S. Cl. X.R.

200—86